Aug. 29, 1961   G. E. SUDEROW   2,997,852
APPARATUS AND METHOD FOR ERECTING A SUPPORTING
STRUCTURE OVER A BODY OF WATER
Filed Dec. 30, 1954   6 Sheets-Sheet 1
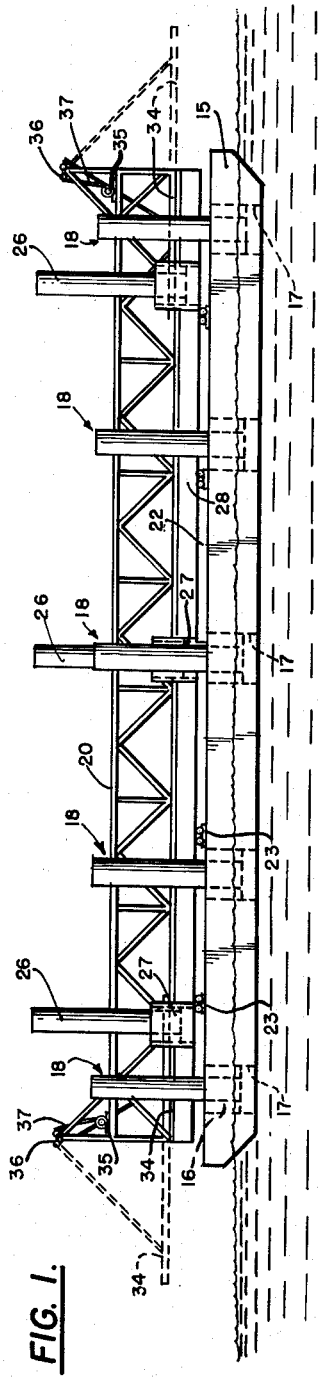
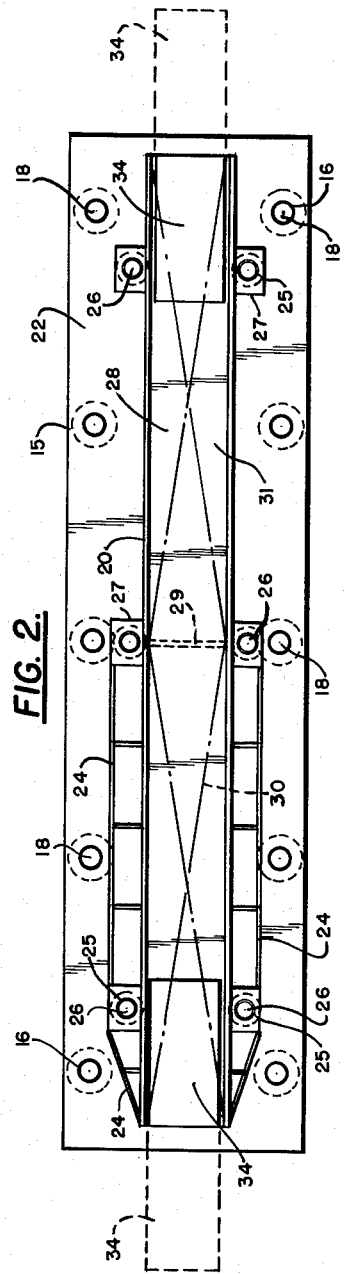
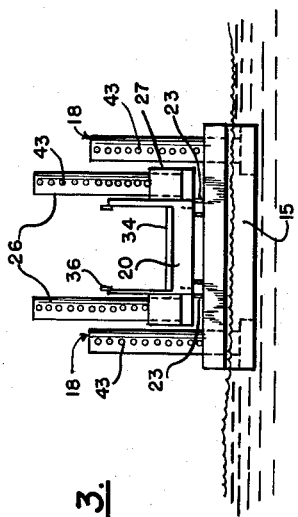
INVENTOR
GEORGE E. SUDEROW
BY
ATTORNEYS

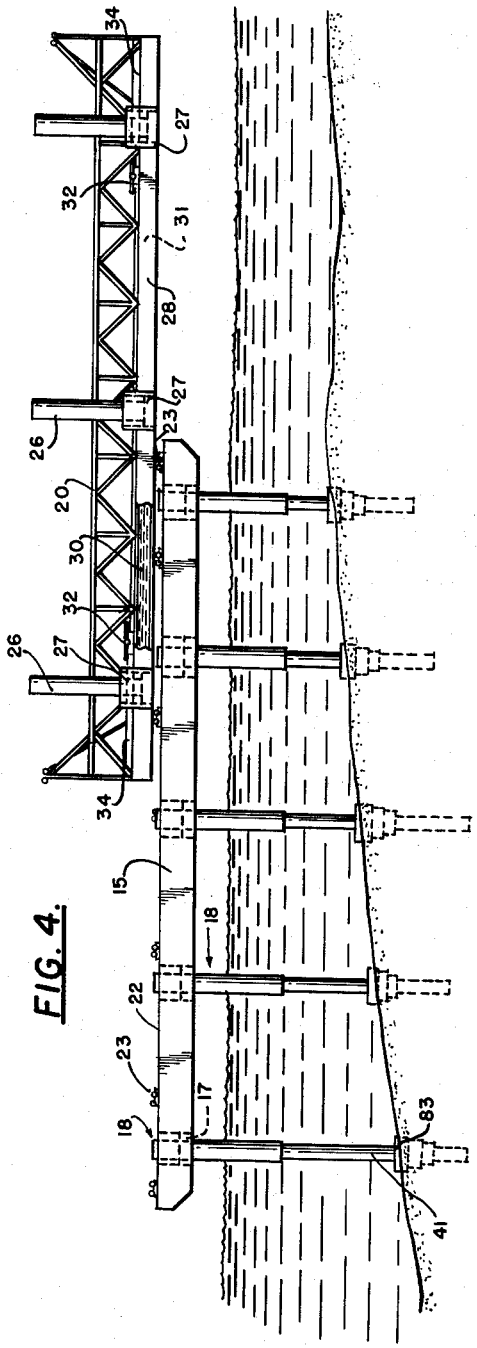

Aug. 29, 1961 G. E. SUDEROW 2,997,852
APPARATUS AND METHOD FOR ERECTING A SUPPORTING
STRUCTURE OVER A BODY OF WATER
Filed Dec. 30, 1954 6 Sheets-Sheet 3
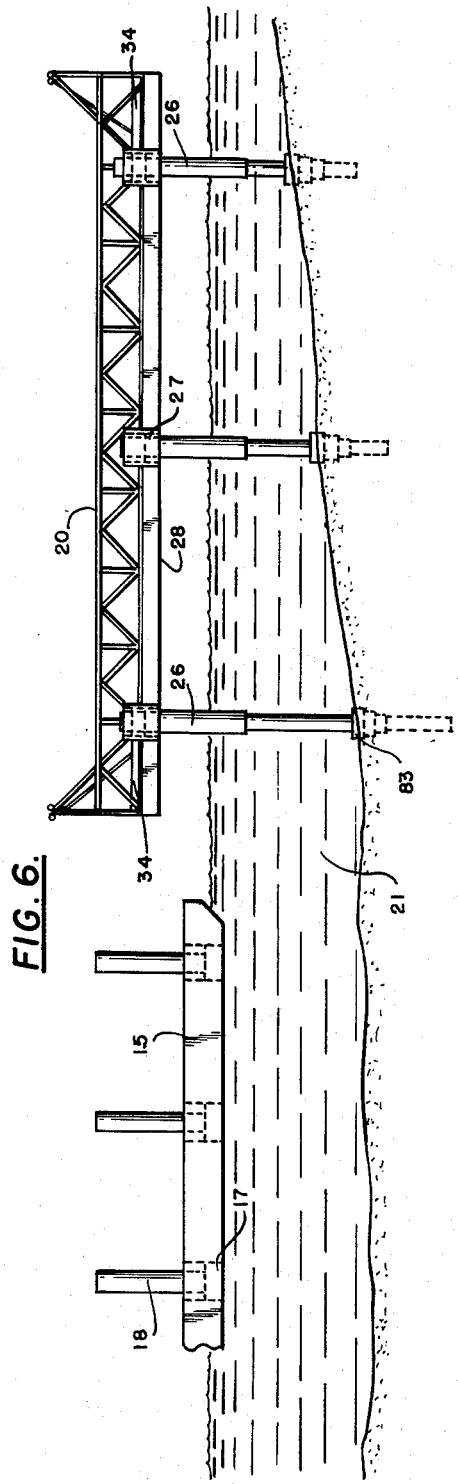
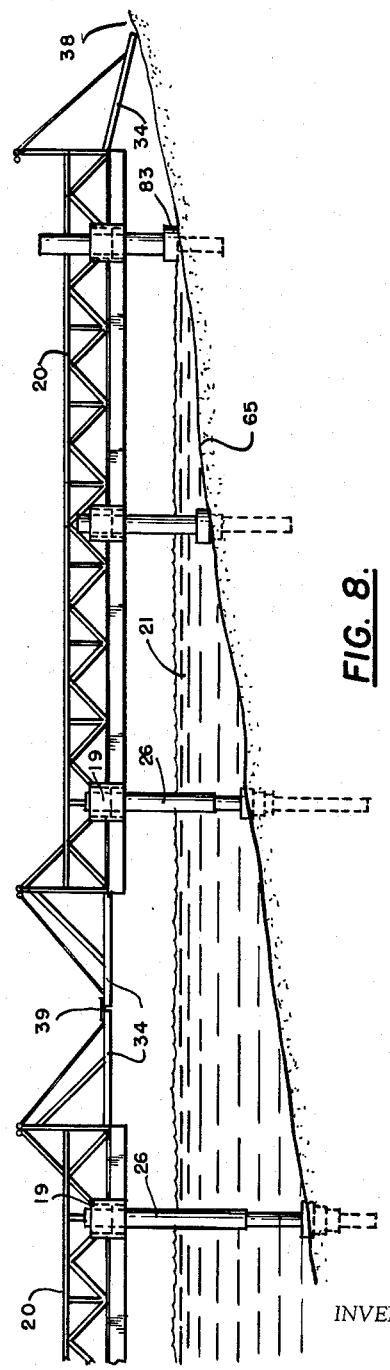
INVENTOR
GEORGE E. SUDEROW
BY
ATTORNEYS Aug. 29, 1961 G. E. SUDEROW 2,997,852
APPARATUS AND METHOD FOR ERECTING A SUPPORTING
STRUCTURE OVER A BODY OF WATER
Filed Dec. 30, 1954 6 Sheets-Sheet 5
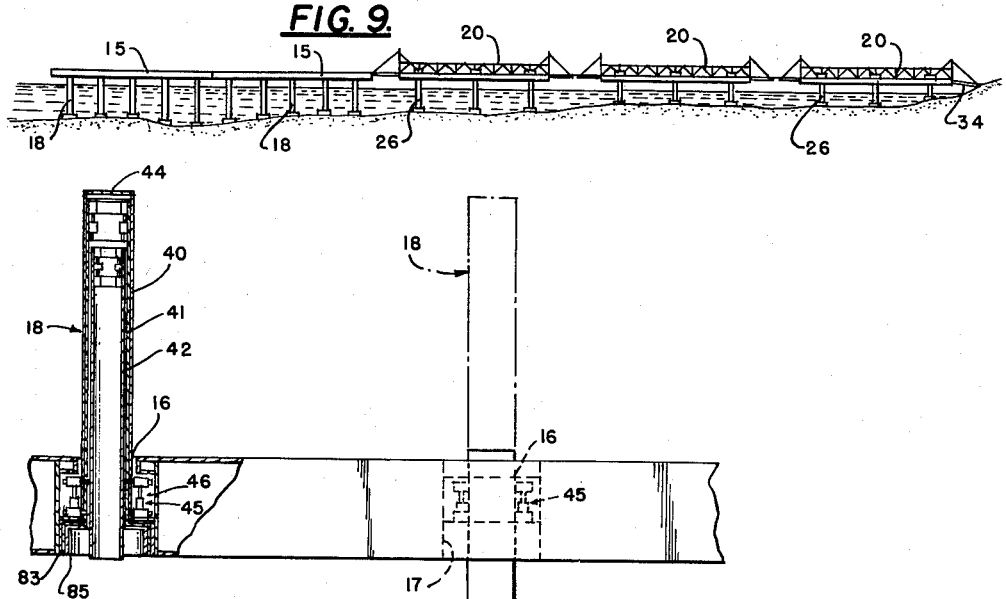
FIG. 9.
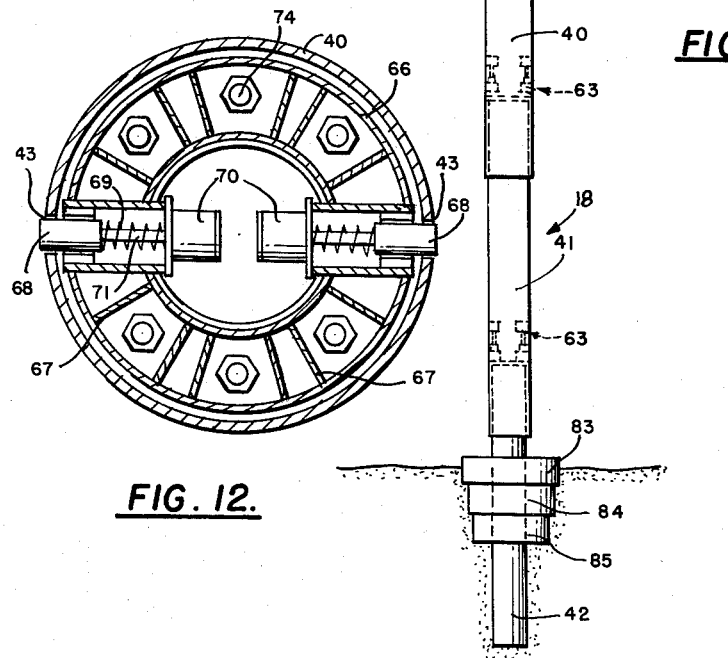
FIG. 10.
FIG. 12.
INVENTOR
GEORGE E. SUDEROW
BY *Cushman Darby & Cushman*
ATTORNEYS

INVENTOR
GEORGE E. SUDEROW

United States Patent Office

2,997,852
Patented Aug. 29, 1961

1

2,997,852
APPARATUS AND METHOD FOR ERECTING A SUPPORTING STRUCTURE OVER A BODY OF WATER
George E. Suderow, New York, N.Y., assignor to De Long Corporation, New York, N.Y., a corporation of Delaware
Filed Dec. 30, 1954, Ser. No. 478,627
11 Claims. (Cl. 61—46.5)

This invention relates to improvements in the invention disclosed in the copending application of Pointer, Serial No. 283,567, now Patent No. 2,775,869. Additionally, this invention relates to an improved method for utilizing structures of the type disclosed in the aforementioned Pointer application to erect a portable pier.

In said Pointer application, there is disclosed a portable marine platform, normally in the form of a barge, having a plurality of rigid, elongated supporting legs that are guided for vertical movement relative to the barge. The platform also includes power-operated jacking mechanisms for selectively effecting or restraining vertical relative movement in either direction between each supporting leg and the barge. By means of this apparatus, the barge can be towed to an erection site, the supporting legs moved down into engagement with the marine bottom, and the barge raised out of the water on the supporting legs to provide a fixed, stable marine platform suitable for a variety of uses. After the operations from the platform have been completed, the barge can be lowered back down on the supporting legs until it is afloat and the legs pulled up so that the entire assembly can be towed to another erection site.

As is pointed out in the copending application of Suderow, Serial No. 402,523, now Patent No. 2,909,900, a platform of the aforedescribed type possesses certain disadvantages. Among these is the fact that the supporting legs for the barge, which legs may be of the order of 100 feet in length, render the entire platform somewhat top-heavy, and consequently unstable, when under tow. Additionally, it will be seen that unless the upper ends of the supporting legs are substantially flush with the deck of the barge when the latter is in its erected position, the working area of the deck is obstructed by such legs.

Accordingly, it is an object of this invention to provide a portable marine platform of the type under consideration wherein the center of gravity of the entire platform is considerably lowered when the entire assembly is in towing condition and wherein towage resistance is not increased.

It is another object of this invention to provide a portable marine platform of the type under consideration wherein the upper ends of the supporting legs can be positioned substantially flush with the deck or working surface of the platform when the latter is erected, substantially irrespective of the water depth at the erection site.

This invention also includes novel methods and apparatus for erecting a portable pier. At the present time, particularly in military operations, situations frequently arise wherein supplies and equipment must be landed on shore at a location where there are no wharf facilities, i.e., a pier or a quay. Consequently, at such a location supplies and equipment must be transferred from transports or freighters to small vessels for transport to shore. Alternatively, a wharf must be built in accordance with the conventional practices. This latter course usually is not feasible, particularly for military operations, both because of the extended time required to construct a conventional pier or a quay and because of the fact that such a wharf will be needed only temporarily.

Accordingly, it is a further object of this invention to provide a self-contained and self-erecting portable pier that can be quickly erected at any desired location without the necessity of any offshore or onshore construction or the employment of accessory equipment, such as cranes or pile drivers, that can be quickly dismantled, and that can be floated to another location.

Other objects and advantages of the invention will become apparent from the following specification and accompanying drawings in which:

FIGURE 1 is a side elevational view of a portable pier assembly embodying this invention;

FIGURE 2 is a plan view of the assembly shown in FIGURE 1;

FIGURE 3 is an end view of the assembly shown in FIGURE 1;

FIGURE 4 is a side view, with parts broken away, of the assembly shown in FIGURE 1 illustrating a step in the erection of the assembly;

FIGURE 5 is a view corresponding to FIGURE 4 but illustrating another step in the erection of the assembly;

FIGURE 6 is a fragmentary view corresponding to FIGURE 4 but illustrating a further step in the erection of the assembly;

FIGURE 8 is a fragmentary view corresponding to FIGURE 6 but illustrating the erection of several of the assemblies shown in FIGURE 1;

FIGURE 9 is a view corresponding to FIGURE 8 but illustrating the final step in the erection of several of the assemblies shown in FIGURE 1;

FIGURE 10 is an enlarged, fragmentary side view, with parts in section, of a part of the assembly shown in FIGURE 1;

FIGURE 12 is an enlarged sectional view taken substantially on line 12—12 of FIGURE 11.

Figure 11:
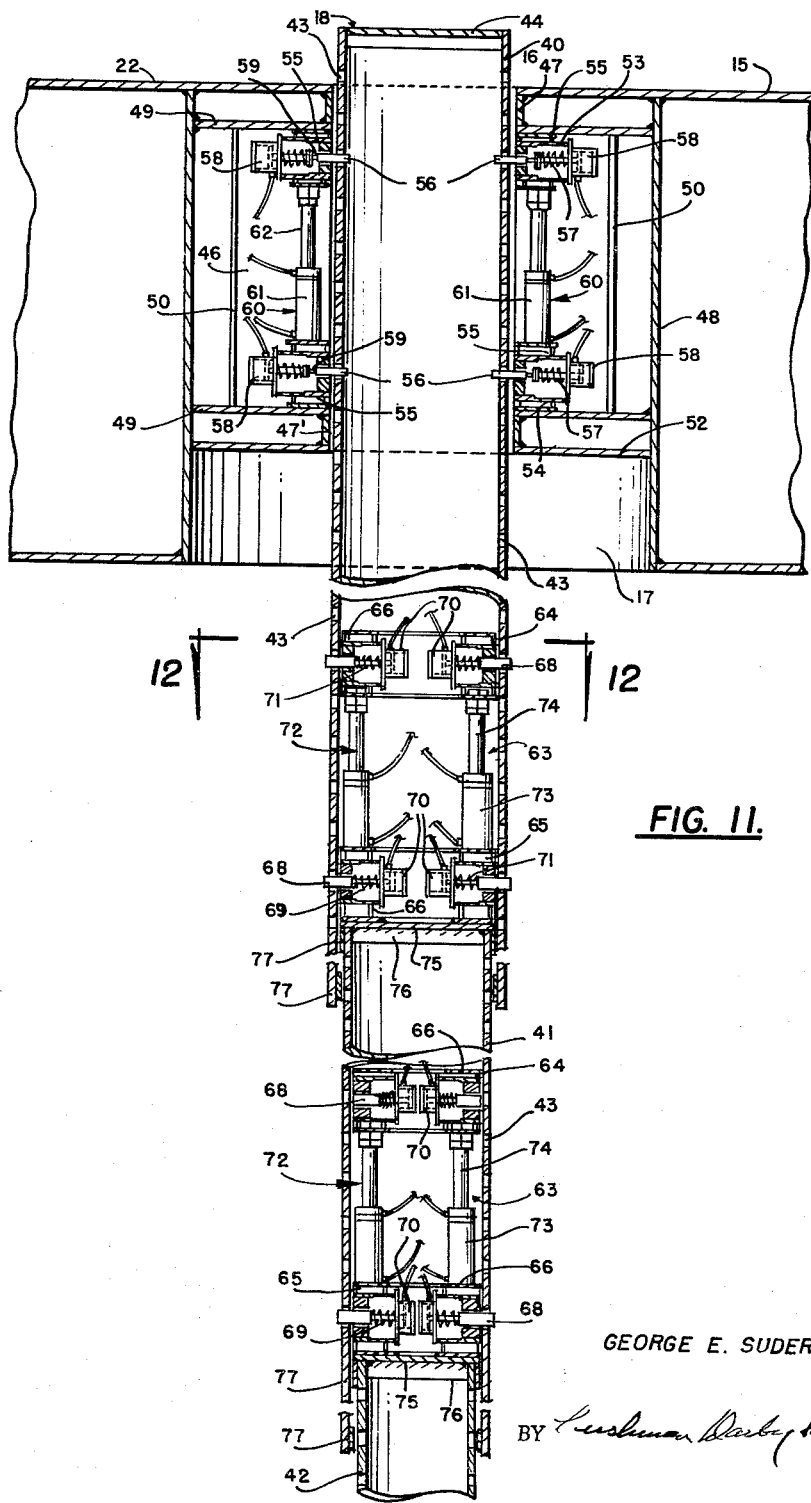
FIGURE 11 is an enlarged, fragmentary, vertical sectional view of a part of the assembly shown in FIGURE 10.

Referring now to the drawings, there is shown in FIGURES 1 to 3 an elongated buoyant body 15, here shown as a floating barge that is generally rectangular in plan view. The barge 15, along the opposite longitudinal sides thereof, is provided with a plurality of vertical openings or guiding wells 16, which are enlarged at their lower ends to provide recesses 17 in the bottom of the barge (FIGURES 10 and 11). Extending loosely through each of the wells 16, and guided thereby for substantially vertical movement relative to the barge 15, is a supporting leg 18, here shown as being of tubular construction. Each supporting leg 18 is of downwardly-extensible telescopic construction that includes an outer section 40 that is received and guided in the well 16 and at least one inner section. Two such inner sections are shown for purposes of illustration; that is, an innermost section 42 and an intermediate section 41. The lower end of the inner section 42 of each leg 18 may have secured thereto an enlarged footing member having telescoping, downwardly-extensible sections 83, 84, and 85 that are retractable to be susbtantially flush with the lower end of the inner section 42 and to fit within the correpsonding recess 17 when each leg 18 is in its fully retracted and raised position, as is shown in FIGURES 1 to 3, and also at the left-hand side of FIGURE 10. Since these footing members are described in detail in the copending application of Suderow, Serial No. 469,092, now Patent No. 2,909,901, no further description is necessary here.

Vertical movement in either direction between the outer section 40 of each leg 18 relative to the barge 15 can be selectively effected or restrained by means of a jacking mechanism 45 that is mounted within the barge, while relative vertical movement in either direction between each adjacent pair of the leg sections can be selectively effected or restrained by means of separate jacking mechanism 63 enclosed within the leg.

Carried on the deck 22 of the barge 15 is a bridge section 20 of truss-like construction and of susbtantially the same length as the barge 15 but of considerably narrower width than the latter. The bridge section 20 is mounted on rollers 23 removably secured to the deck 22 so that the bridge section can be moved longitudinally in either direction on the barge 15. Secured to the bridge section 20 along the opposite longitudinal sides thereof are longitudinally spaced pairs of wing members 27. The distance between the outer ends of each pair of wing members 27 is less than the distance between the two rows of supporting legs 18 on the opposite sides of the barge 15, so that the entire bridge section 20, including the wing members, can be accommodated on the deck 22 of the barge 15 between the two rows of supporting legs 18 (FIGURES 2 and 3). Preferably, guide fenders or guards 24 (FIGURE 2) are secured to both sides of the bridge section 20 and extend between adjacent wing members 27, and also from the wing members at one end of the bridge section toward the corresponding end of the latter to both facilitate movement of the bridge section onto the barge 15, as will be later described, and assist in maintaining the bridge section 20 in proper position on the barge 15 when being transported to an erection site by the latter.

Each of the wing members is provided with a vercal opening or guiding well 25 (FIGURE 2) substantially identical to the guiding wells 16 on the barge 15, and mounted in each such well 25 is a telescopic supporting leg 26 substantially identical to the supporting legs 18 on the barge 15. Relative vertical movement between the outer section of each of the legs 26 and the bridge section 20 can be selectively effected or restrained by a jacking mechanism, identical to the jacking mechanism 45, mounted in the corresponding wing member 27 while relative vertical movement in either direction between each pair of adjacent sections of each leg 26 can be selectively effected or restrained by jacking mechanisms housed within the leg and identical to the jacking mechanisms 63. The bridge section 20 is provided with at least three pairs of wing members 27 and corresponding supporting legs 26, with one such pair being located at the midlength of the bridge section, and the other two pairs located adjacent the opposite ends of the bridge section. Thus the center pair of supporting legs 26 and one end pair can be employed to stably support the bridge section 20 as described hereinafter.

Preferably, the bridge section 20 is provided with a hollow base 28 that is divided by central, transverse interior partition 29 (FIGURE 2) into two ballast chambers or compartments, 30 and 31, as indicated by the dot-dash lines in FIGURE 2. Additionally, each bridge section 20 is provided with pumping apparatus 32 (FIGURE 4) to selectively introduce water into each of the compartments 30 and 31 or to selectively withdraw water therefrom. By means of this arrangement, either of the compartments 30 or 31 can be filled with water to correspondingly increase the weight ratio between the corresponding end of the bridge section 20 and the opposite end thereof. In other words, filling one of the compartments 30 or 31 with water will render that end of the bridge section considerably heavier than the opposite end, for purposes later described. Although water ballast compartments 30 and 31 have been illustrated as a convenient means for effecting the aforedescribed change in weight ratio, it will be manifest that any appropriate means may be used for the same purpose.

At each end, the bridge section 20 desirably is provided with a liftover platform 34 which is pivotally connected to the corresponding end of the bridge section so that it may be swung from the second position inboard of the bridge section shown in solid lines in FIGURES 1 and 2, to the outboard position shown in dotted lines in FIGURES 1 and 2 and in full lines in FIGURE 8. Swinging movement of each liftover platform 34 can be accomplished by any appropriate means, such as by a cable 37 running over a sheave 36 on an elevated structure at the corresponding end of the bridge section 20 and connected to a manually operable winch 35 (FIGURE 1).

Referring now to FIGURES 10 to 12 of the drawings, it will be seen that each of the guiding wells 16 is interiorly enlarged between the deck 22 of the barge 15 and the top wall 52 of the recess 17 to provide a compartment 46 having its sidewalls formed by bulkheads 48 that are reinforced by vertical stiffening members 50. The upper and lower walls 49 of the compartment 46 preferably are spaced below the deck 22 and above the top wall 52 of the recess 17, respectively, and connected thereto by sleeve-like walls 47 and 47', respectively, which form the guiding portion of the well 16.

The jack mechanism 45 is disposed in the compartment 46 and includes upper and lower pin assemblies 53 and 54, respectively, which are substantially identical so that a description of one will suffice for both. Each pin assembly 53 and 54 includes an annular box-like structure 55 surrounding the leg section 40 and adapted to abuttingly engage the corresponding upper or lower wall 49 of the compartment. Carried by the box-like structure 55 is a pair of diametrically-disposed aligned locking pins 56 that are reciprocable transversely of the supporting leg section 40. The latter is provided on opposite sides thereof with two longitudinal rows of uniformly-spaced, pin-receiving openings 43 that are aligned transversely of the section 40. Thus, when a pair of such openings 43 is in alignment with the pins 56 the latter can be projected thereinto so as to lock the structure 55 against movement relative to the section 40. Each pin 56 is constantly urged radially inwardly toward the section 40 by a spring 57 and can be moved in the opposite direction for withdrawal from the section 40 by a fluid pressure motor 58 having the pin 56 connected to the piston rod 59 thereof. A circularly arranged series of circumferentially-spaced, double-acting fluid pressure motors 60 have their cylinders 61 secured to the box-like structure 55 of the lower pin assembly 54 and their piston rods 62 connected to the structure 55 of the upper pin assembly 53.

By appropriate operation of the motors 60, it will be seen that the upper and lower pin assemblies 53 and 54 can be moved toward or away from each other. It also will be seen that by appropriate operation of the motors 58 and 60, generally in the manner disclosed in the aforementioned Pointer application and as more particularly described in the copending application of Suderow, Serial No. 378,103, now Patent No. 2,822,670, the leg section 40 can be selectively moved vertically, step-by-step, in either direction relative to the barge 15 or restrained against such movement. Consequently, the section 40 can be supported on or forcefully lowered or raised relative to the barge 15, or the latter can be supported on or raised or lowered relative to the section 40.

Relative vertical movement in either direction between any pair of adjacent sections of a leg 18, i.e., between the outer section 40 and the intermediate section 41 and between the latter and the inner section 42, can be selectively effected or restrained by the jack mechanisms 63 that are disposed, respectively, within the outer section 40 and the intermediate section 41. Since both of these mechanisms 63 are identical, a description of one will suffice for both, and such description will be made with reference to the leg sections 40 and 41. The jack mechanism 63 includes upper and lower pin assemblies 64 and 65, which are substantially identical, so that again a description of one will suffice for both. Each pin assembly includes an annular box-like structure 66 telescopingly received within the section 40. Preferably, the box-like structure 66 is reinforced by a plurality of circumferentially spaced radially-disposed interior plates 67 (FIGURE 12). Carried by the structure 66 is a pair of diametrically disposed aligned locking pins or bolts 68 that are reciprocable for projection radially outwardly into or withdrawal from a pair of the holes 43 in the section 40 when the pins 68 are aligned with such holes. Obviously, when the pins 68 project through such holes 43, the corresponding pin assembly 64 or 65 is locked to the section 40 against movement relative thereto. Each pin 68 is constantly urged outwardly by a spring 69 and is movable inwardly out of engagement with a hole 43 by a fluid pressure motor 70 having the pin 68 connected to the end of the piston rod 71 thereof. A circularly-arranged series of double-acting fluid pressure motors 72 have their cylinders 73 secured to the structure 66 of one of the pin assemblies 64 and 65 and their piston rods 74 connected to the structure 66 of the other pin assembly. Appropriate operation of the motors 72 will urge the pin assemblies 64 and 65 toward or away from each other. The box-like structure 66 of the lower pin assembly 65 is securely fastened, as by welding, to the upper end of the intermediate section 41.

By appropriate operation of the motors 70 of the upper and lower pin assemblies 64 and 65, and also of the motors 72, relative vertical step-by-step movement in either direction between the sections 40 and 41 can be selectively effected or restrained. In an identical manner, relative vertical step-by-step movement in either direction between the sections 41 and 42 can be selectively effected or restrained.

The upper ends of each of the inner sections 41 and 42 may be closed by a disc 75 welded thereto, and such disc 75 may be reinforced by a transverse stiffening rib 76. Preferably, the upper end of the outer section 40 also is closed by a reinforced disc 44. Extension of each pair of adjacent sections relative to each other is limited to prevent separation therebetween by appropriate stops, such as the rings 77 secured, as by welding, one to and within the lower open end of the outer section of the pair and the other exteriorly on the upper end of the inner section of the pair.

In order to erect an assembly embodying this invention, the assembly, in the condition shown in FIGURES 1 to 3, is towed to an appropriate erection site. In this connection, it will be seen that the supporting legs 18 and 26 of both the barge 15 and the bridge section 20 are in their fully raised and retracted condition, wherein the lower ends of the legs are substantially flush with the lower ends of their guiding wells 16 and 25, so that the bridge section is supported solely on its base 28, which rests on the rollers 23, and the legs 18 do not project beneath the bottom of the barge 15 to thereby minimize towage resistance of ethe entire assembly. In these retracted and raised positions it will be seen that the telescopic supporting legs 18 and 26 are of much shorter length than would be necessary were such legs not telescopic. In other words, the various supporting legs are about only one-third as long as a non-sectional and non-telescopic supporting leg of equivalent effective length. Consequently, the center of gravity of the entire assembly is much lower than would be the case were non-telescopic legs of equivalent length employed. Hence, the entire assembly is seaworthy and can be towed in rough seas without danger of capsizing. In this connection, any appropriate lashing or other fastening or hold-down means (not shown) can be employed to secure the bridge section 20 to the barge 15 while under tow.

When the erection site has been reached, the jacking mechanisms 45 and 63 for the legs 18 are operated in unison to extend and lower such legs downwardly into engagement with the marine bottom. All of these jacking mechanisms then are further operated to raise the barge 15, together with the bridge section 20 carried thereby, out of the water so that the barge becomes a fixed and stable platform. Preferably, these operations are carried out by first extending the inner leg sections 42 a distance sufficient for the telescopic footings 83, 84, and 85 to become fully extensible without interference from the intermediate section 41. Then the outer leg sections 40 are lowered in unison relative to the barge 15 until the upper ends of these sections are flush with the barge deck 22, and thereafter the jacking mechanisms 63 are operated to force the legs 18 to a firm bearing in the marine bottom and to raise the barge 15 out of the water. By this procedure, the upper ends of the legs 18 will be flush with the barge deck 22, when the barge is erected, to provide an unobstructed working area thereon.

After the barge 15 is so erected, the lashings or other hold-down means for the bridge section 20 are released and one of the compartments 30 or 31 in the bridge section is filled with water to thereby render the corresponding end of the bridge section heavier than the other end. By any appropriate means, such as winches and cables (not shown), the lighter end of the bridge section 20 is then rolled off of one end of the barge 15 into the position best shown in FIGURE 4 wherein four of the supporting legs 26 of the bridge section are positioned outboard of one end of the barge 15, while overbalancing or tilting of the bridge section is prevented by the heavier end remaining on the barge, i.e., for example, by the water in the compartment 30. In performing this operation, it will be seen that because the platform 15 is rigid and stable, there will be no danger of losing control of the bridge section 20 by reason of pitching or rolling movements of the barge 15 were it afloat in relatively heavy seas. In other words, were the barge 15 not converted into a fixed and stable platform as shown in FIGURE 4, it will be seen that movement of the bridge section 20 into the overhanging position shown in that figure would be an extremely dangerous operation and one in which complete control of the bridge section might be lost so that the latter might fall into the water.

The inner sections 42 of the four outboard supporting legs 26 of the bridge section 20 then are lowered until their telescopic footings can become fully extensible and the outer sections 40 then lowered relative to the bridge section 20 as far as possible, i.e., preferably until their upper ends are substantially flush with the upper sides of the wing members 27. Thereupon, the jacking mechanisms 63 of the legs 26 are operated to force the legs 26 downwardly to a firm bearing in the marine bottom in order to be able to support the entire weight of the bridge section 20. At this time, the water in the compartment 30 is transferred to the compartment 31 so that the support of the bridge section 20 by the barge 15 can be discontinued and the bridge section supported solely on the four outboard marine-bottom-engaged legs 26, as shown in FIGURE 5, without danger of overbalancing or tilting.

Thereupon, the jacking mechanisms 45 and 63 for the supporting legs 18 of the barge 15 are operated to lower the barge back into the water until it is afloat, and the supporting legs 18 are then retracted and raised sufficiently so that the barge 15 can be floated out from beneath the bridge section 20. At this time, the two unlowered and unretracted legs 26 on the bridge section 20 are lowered and extended to engage the marine bottom, as shown in FIGURE 6, so that the bridge section 20 will now be stably supported on all six of its supporting legs 26. At this time, the water in the compartment 31 can be drained or pumped therefrom.

The barge 15 can then be maneuvered into a position wherein it is in closely-spaced longitudinal alignment with the bridge section 20, as is best shown in FIGURE 6. The supporting legs 18 of the barge 15 are then extended and lowered, in the manner previously described, and the barge raised on its supporting legs until the deck 22 of the barge is substantially on a level with the bridge section 20. At this time the liftover platform 34 at that end of the bridge section 20 adjacent the barge 15 can be lowered to overlap the corresponding end of the barge so as to provide access for traffic between the barge and the bridge section, as is shown in FIGURE 9. In this connection, it will be noted that in this elevated position of the barge 15, the rollers 23 are removed from the deck 22 of the barge so that the entire deck 22 of the latter is unobstructed to provide a large working area. Additionally, it also will be seen that the barge 15 provides a stable, fixed, marine platform that will serve admirably as a land-place or stage for the loading and unloading of large ships.

This invention finds particular usage in providing a portable pier that will extend from the shore outwardly into the water as is best shown in FIGURES 8 and 9. In this instance, the bridge section 20 is erected at a location where one end of the bridge section is substantially on shore, as is best shown in FIGURE 8. This positioning of the bridge section 20 can be effected, even from the floating barge 15, because it will be seen that the barge can be brought near enough to shore without danger of grounding so that the bridge section 20 can be rolled off the barge and project over or onto the shore. After the bridge section 20 has been so erected, the liftover platform 34 on the shore end of the bridge section can be lowered to form an access ramp from shore to the bridge section, as shown in FIGURE 8. The barge 15 can then be erected at the other end of the bridge section 20 to form a landing stage for ships as aforedescribed.

In the event that the water is not deep enough to accommodate vessels by the use of only one shore-based bridge section 20 and a barge 15, additional portable pier assemblies can be used to erect bridge sections to extend the shore bridge section 20 in the manner shown in FIGURE 8 wherein the liftover platforms 34 at the adjacent ends of two bridge sections are lowered and interconnected with a cross-over plate 39. Obviously, any number of such bridge sections 20 can be erected, by the use of pier assemblies of the type shown in FIGURE 1, in order to extend the pier out to deep water so that large vessels can be unloaded onto or loaded from the landing stage or area provided by an erected barge 15 at the outer end of the pier. In this connection, it will be seen that if a single barge 15 does not provide a large enough landing stage, several such barges, i.e., those used to carry the several pier sections 20, can be erected either end-to-end, as shown in FIGURE 9, or side-by-side to provide an extended landing area or stage for large vessels.

After the necessary loading or unloading operations have been accomplished and there is no longer any need for the erected pier at the site, the pier can be dismantled for movement to another erection site by a procedure which essentially involves a reversal of the procedure used in erecting the pier. First of all, the liftover platforms are raised and the barge 15 is lowered back down into the water and its supporting legs 18 retracted and raised sufficiently so that one end of the barge can be moved beneath one end of the pier section 20. Prior to this positioning of the barge, the two legs 26 at one end of the pier section 20 have been raised and retracted to the stowed position shown in FIGURE 5, so that the bridge section is supported solely on four of its supporting legs 26. In this connection, water ballast should be added to that compartment 31 overlying the four marine-bottom-engaged supporting legs 26 so that the two raised supporting legs 26 can be pulled loose and raised from the marine bottom without danger of overbalancing the bridge section. As before, the supporting legs of the barge 15 are extended and lowered into engagement with the marine bottom and the barge 15 elevated until the replaced rollers 23 thereon engage the underside of the unsupported end of the bridge section 20, again as best shown in FIGURE 5. In this position of the barge and bridge section, water ballast is transferred from the compartment 31 to the compartment 30 so that the four marine-bottom-engaged supporting legs 26 of the bridge section can be retracted and raised without overbalancing the bridge section 20. Of course, during this operation, the bridge section 20 is supported on the barge 15. Once the last four supporting legs 26 of the bridge section 20 are raised and retracted, as shown in FIGURE 4, the bridge section is rolled back onto the barge 15 into towing position and lashed down. It will be seen that as the bridge section 20 is rolled back onto the barge 15, the fenders 24 serve to guide and align the bridge section between the two rows of legs 18 of the barge 15. Hence, when the bridge section is being restowed on the barge 15, it is desirable for the legs 18 of the latter to project above the deck 22. The barge 15 carrying the bridge section 20 can then be lowered back down into the water until it is afloat, the supporting legs 18 retracted and raised, and the entire assembly towed to another erection site.

It will be seen that the bridge sections, because they serve for traffic only, can be made of lighter and less expensive construction than the barge 15. Additionally, the bridge sections need not be buoyant, but only of openwork construction save for the ballast tanks 30 and 31, and, of course, the necessary traffic-bearing surface on the bridge section. It also will be seen that by means of this invention, a pier can be readily erected at a minimum expenditure of time and effort and relocated with the same ease. Moreover, it will be seen that the use of heavy extra equipment, such as lifting cranes, pile drivers, etc., is not necessary for the erection of a pier in accordance with this invention. It further will be seen that because one of the pier sections may be extended to the shore as shown in FIGURE 8, and the shore end liftover platform of such section utilized as a ramp to provide access from the shore to the bridge section, there is no necessity of building a structural approach to the pier or of transferring large quantities of earth for such purposes.

Figure 7:
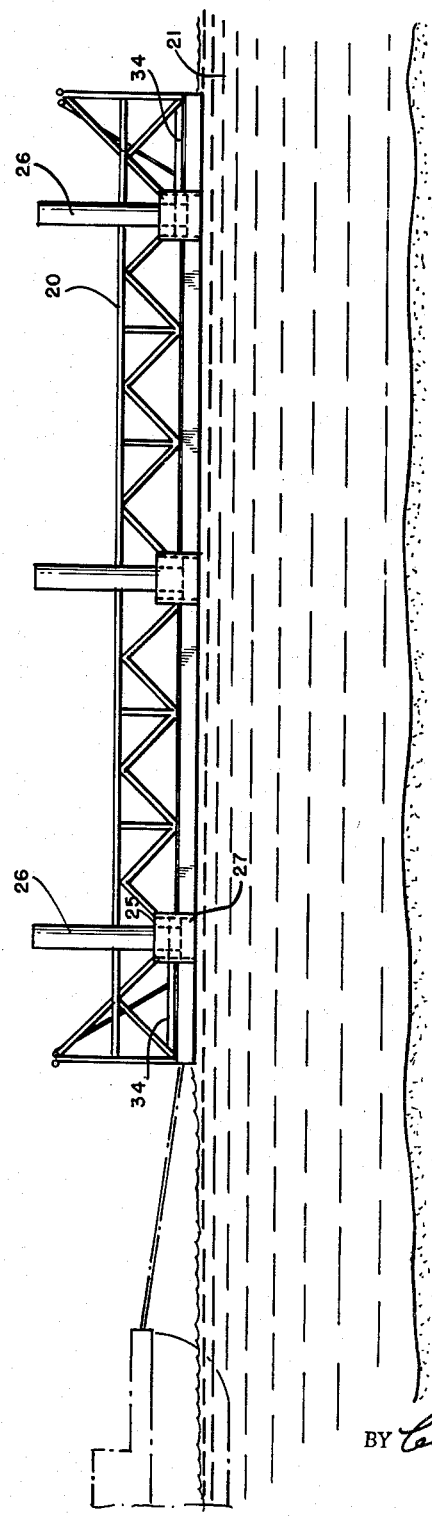
FIGURE 7 is a side view of a part of the assembly shown in FIGURE 1 illustrating an alternative step in the erection of the assembly.

In some locations, it may be difficult to maneuver the entire assembly of barge and bridge section into an exact position necessary for proper erection of the bridge section. To overcome this difficulty, it may be desirable to construct the bridge section so that it will be buoyant, for example by making the tanks or compartments 30 and 31 large enough for that purpose. In that event the bridge section 20 can be transferred off the barge 15 at any convenient and appropriate site, by the foregoing procedures, and then lowered back down into the water on its supporting legs 26 until it is afloat, the legs 26 retracted and raised, and towed or maneuvered by a tug 80 into the desired erection position, as shown in FIGURE 7.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. The method of erecting a bridge, pier, or the like formed of connectable end to end sections, which includes floating to an erection site a barge carrying a mobile bridge section both having vertically movable marine-bottom-engageable supporting legs, lowering the legs on the barge to engage the marine ground, raising the barge on the legs above the water, adding weight to one end portion of the mobile section to temporarily provide a heavy end portion and an opposite light end portion, moving the mobile section longitudinally relative to the barge so that its now light end portion extends beyond the adjacent end of the barge and is balanced by its heavy end portion, lowering the legs on the light end portion so that these legs engage the marine ground, removing the weight from the heavy end and transferring it to the opposite light end portion, lowering the barge on its legs so as to refloat the former, and lowering the legs on the now light end portion of the mobile section when the barge is moved away therefrom.

2. The method of erecting a bridge, pier, or the like, or a section thereof, the steps comprising: floating to an erection site a buoyant body carrying a section; raising the body out of the water and stably supporting the body on a plurality of marine-bottom-engaged members; horizontally moving the section partially off the body so that an extended portion of the section projects beyond the body without overbalancing; supporting the projecting portion of the section on a plurality of marine-bottom-engaged members in a manner to stably support the entire section independently of the body; lowering the body back into the water and floating it from beneath the section; and supporting the remaining portion of the section on marine-bottom-engaged members in a manner to increase the stability of support of the entire section.

3. The method defined in claim 2 including the additional steps of prior to the moving step increasing the weight of the remaining section portion relative to the portion to be projected, and prior to the lowering step increasing the weight of the projecting portion relative to the remaining portion.

4. The method of erecting a supporting structure over a body of water, the steps comprising: floating to the site an assembly comprising a buoyant body carrying thereon a second body; raising the buoyant body on a plurality of marine-bottom-engaged supporting legs and stably supporting thereon at least a major portion of the weight of the buoyant body; moving the second body horizontally on the buoyant body until an extended portion of the former projects outboard of the latter while maintaining the second body against overbalancing on the buoyant body; transferring the entire support of the second body from the buoyant body to additional supporting legs engaged with the marine bottom and with the extended portion of the second body in a manner to stably support the entire second body independently of the first body; lowering the buoyant body until it is afloat and floating it from under the second body while maintaining the latter against overbalancing on the additional legs; and stably supporting the second body with further marine-bottom-engaged legs engaged with the remaining portion of the second body.

5. The method defined in claim 4 wherein the steps of maintaining the second body against overbalancing and of stably supporting it independently of the first body are accomplished by increasing the weight ratio between the supported and non-supported portions of the second body.

6. The method of erecting a pier, the steps comprising: floating to a site close to shore an assembly comprising a buoyant platform-like body carrying thereon an elongated bridge section; orienting the assembly so that the bridge section is generally normal to the shore line; raising the buoyant body on a plurality of marine-bottom-engaged legs and stably supporting thereon at least a major portion of the weight of the buoyant body; moving the bridge section horizontally on the buoyant body toward the shore until an extended portion of the bridge section projects outboard of the buoyant body and one end of the bridge section is adjacent the shoreline while maintaining the bridge section against overbalancing on the body; transferring the entire support of the bridge section from the buoyant body to additional supporting legs engaged with the marine bottom and with the extended portion of the bridge section in a manner to stably support the bridge section independently of the buoyant body; lowering the buoyant body until it is afloat and floating it from under the bridge section while maintaining the latter against overbalancing on the additional legs; stably supporting the bridge section with further marine-bottom-engaged legs engaged with the remaining portion of the bridge section; positioning the buoyant body adjacent the offshore end of the bridge section; raising the buoyant body to the level of the bridge section on a plurality of marine-bottom-engaged legs and stably supporting thereon the buoyant body; and connecting the latter and the bridge section with crossover means.

7. A portable assembly for the erection of a pier, comprising a buoyant platform-like first body; a plurality of marine-bottom-engageable first supporting legs mounted on said first body for extension and retraction therebeneath and for stably supporting said first body; power-operated means for selectively effecting or restraining said extension or retraction; an elongated platform-like second body carried on said first body; means mounting said second body for longitudinal movement on said first body to project an extended portion of said second body outboard of said first body; a plurality of marine-bottom-engageable second supporting legs mounted on said second body for extension and retraction therebeneath and including at least three second legs mounted on said extended portion for stably supporting said second body independently of said first body; power-operated means for selectively effecting or restraining said extension or retraction of said second legs; selectively operable means for maintaining said second body against overbalancing on said first body when said extended portion is projected outboard of said first body and said second body is supported solely on said first body; and selectively operable means independent of said last-mentioned means for maintaining said second body against overbalancing when supported solely on said three second legs.

8. The structure defined in claim 7 in which the means mounting the second body on the first includes rollers.

9. The structure defined in claim 7 in which the first-mentioned means for maintaining the second body against overbalancing includes a water ballast tank on the inboard portion of said second body.

10. The structure defined in claim 7 in which the means for maintaining the second body against overbalancing on the three legs includes a water ballast tank on the extended portion.

11. The structure defined in claim 7 in which the second legs include additional legs mounted on the inboard portion of the second body to increase the stability of support of said second body independently of the first body.

References Cited in the file of this patent

UNITED STATES PATENTS

| | | |
|---|---|---|
| 379,861 | Cornell | Mar. 20, 1888 |
| 2,291,078 | Harris | July 28, 1942 |
| 2,308,743 | Bulkley et al. | Jan. 19, 1943 |
| 2,475,933 | Woolslayer et al. | July 12, 1949 |
| 2,505,832 | Lange | May 2, 1950 |
| 2,531,983 | McCoy | Nov. 8, 1950 |
| 2,592,448 | McMenimen | Apr. 8, 1952 |
| 2,600,761 | Halliburton | June 17, 1952 |
| 2,657,540 | Templeton | Nov. 3, 1953 |
| 2,775,869 | Pointer | Jan. 1, 1957 |
| 2,817,212 | Stubbs | Dec. 24, 1957 |
| 2,833,118 | Nixon | May 6, 1958 |

OTHER REFERENCES

The De Long pier, Washington Star Pictorial Section of February 7, 1954, pp. 12 and 13.